(12) United States Patent
Fleck (10) Patent No.: US 10,073,548 B2
(45) Date of Patent: Sep. 11, 2018

(54) STYLUS HAVING VARIABLE TRANSMIT SIGNAL STRENGTH, AND SENSOR FOR DETECTING SUCH STYLUS

(71) Applicant: Wacom Co., Ltd., Saitama (JP)

(72) Inventor: David Charles Fleck, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/345,943

(22) Filed: Nov. 8, 2016

(65) Prior Publication Data

US 2018/0129305 A1    May 10, 2018

(51) Int. Cl.
*G06F 3/03*    (2006.01)
*G06F 3/038*   (2013.01)
*G06F 3/041*   (2006.01)
*G06F 3/0354*  (2013.01)

(52) U.S. Cl.
CPC ........ *G06F 3/0383* (2013.01); *G06F 3/03545* (2013.01); *G06F 3/0416* (2013.01); *G06F 2203/04108* (2013.01)

(58) Field of Classification Search
CPC .................. G06F 3/0383; G06F 3/0416; G06F 2203/04108
See application file for complete search history.

(56) References Cited

U.S. PATENT DOCUMENTS

2015/0363012 A1* 12/2015 Sundara-Rajan ....... G06F 3/038
                                                          345/179
2016/0266663 A1*  9/2016 Holsen ................ G06F 3/03545
2017/0308189 A1* 10/2017 Peretz ................. G06F 3/03545

FOREIGN PATENT DOCUMENTS

WO    2015/191807 A1    12/2015

OTHER PUBLICATIONS

Extended European Search Report, dated Mar. 14, 2018, for European Application No. 17200093.7-1216, 10 pages.

* cited by examiner

*Primary Examiner* — Liliana Cerullo
(74) *Attorney, Agent, or Firm* — Seed IP Law Group LLP (57) ABSTRACT

Various embodiments provide detection of a stylus at a large distance from a surface of a device, such as a tablet, by increasing the stylus' transmitted signal strength. In addition, signal strength transmitted by the stylus is lowered when the stylus is close to the surface of the device to avoid saturating of a receiving circuit of the device and conserve power. The distance between the stylus and the surface of the device is determined by measuring the strength of a signal received by the stylus and/or a signal received by the device.

17 Claims, 4 Drawing Sheets

STYLUS HAVING VARIABLE TRANSMIT SIGNAL STRENGTH, AND SENSOR FOR DETECTING SUCH STYLUS

BACKGROUND

Technical Field

This disclosure relates to improving detection of a stylus by an electronic device, such as a tablet based computing device or a tablet peripheral attached to a computing device.

Description of the Related Art

Many current styli include various electronic components that facilitate bidirectional communication (i.e., sending and receiving signals) with an electronic device, such as a tablet or mobile phone. For example, an electronic device may send a request for data from a stylus and the stylus may send the requested data. A location of a stylus on a surface of an electronic device may be determined based on a signal transmitted by the stylus. Namely, a control circuit in the electronic device may sequentially sample signals from the active stylus, and the location of the stylus may be determined based on the signal strengths of the sampled signals.

Unfortunately, there is a limit as to how far away a stylus may be from an electronic device as signals sent or received between the stylus and the electronic device generally become weaker as the stylus moves further away from the electronic device. Attempting to overcome this by increasing the signal sent by the stylus often results in the receiving circuitry in the device becoming saturated when the stylus is near the surface. Accordingly, a stylus and an electronic device are typically unable to communicate unless they are in within close proximity of each other.

BRIEF SUMMARY

The present disclosure is directed to a system and method for improving a distance or height in which a stylus may be detected by an electronic device, such as a computer, a tablet, and a smartphone, by adjusting signal strength of signals transmitted by the stylus.

According to one embodiment, the system includes a stylus and an electronic device.

The electronic device may include a stylus sensor, a sensor controller, a host processor, and a display. The stylus sensor includes a plurality of sensing antennas, such as loop coil antennas or line conductor antennas. The sensing antennas receive or detect signals from the stylus. The sensor controller controls the operation of the stylus sensor, performs bidirectional communication with the stylus, and communicates with the host processor. The host processor communicates with the sensor controller and executes a variety of applications or functions. The display is configured to display text or graphics. In one embodiment, the electronic device also includes a signal strength sensor that measures strengths of signals received by the sensing antennas from the stylus.

The stylus may include a power source, an information manager, a data manager, sensors, buttons, a communication module, an electrode, and a gain controller housed by a body. The power source provides power to the stylus. The information manager may include a memory or cache that stores stylus capability information of the stylus. The data manager prepares operational data indicative of an operational state of the stylus, such as tip pressure data and orientation data. The sensors include one or more sensors, such as a stylus tip pressure sensor and a barrel sensor, which generates operational data of the stylus. The communication module provides bidirectional communication with the electronic device. The gain controller adjusts the gain or strength of signals transmitted by the TX circuitry of the communication module. In one embodiment, the stylus also includes a signal strength sensor that measures strengths of signals received by the RX circuitry of the communication module from the sensor controller.

According to one embodiment, the method includes adjusting signal strength of signals transmitted by the stylus based on a distance between the stylus and the electronic device. Strength of a signal transmitted between a stylus and a stylus sensor is used as a proxy for the distance between the stylus and the electronic device. The method includes, in part, measuring strength of a signal currently being transmitted between the stylus and the electronic device (i.e., a signal transmitted from the stylus to the electronic device, and/or a signal transmitted from the electronic device to the stylus), and determining whether the measured strength of the signal corresponds to a first height value or a second height value, each indicative of a height of the stylus relative to the stylus sensor. For example, a threshold height is set, and the measured strength of the signal corresponding to a height at or below the threshold height is determined to correspond to the first height value, and the measured strength of the signal corresponding to a height above the threshold height is determined to correspond to the second height value. The method then includes adjusting the strength of the signal transmitted by the stylus to a first strength value in response to the determined first height value and to a second strength value different from the first strength value in response to the determined second height value. Thus, the transmit signal strength of the stylus is adjusted according to the determined height of the stylus relative to the stylus sensor (e.g., a greater transmit signal strength is used when the stylus is farther away from the stylus sensor) to thereby increase the detectable height of the stylus.

In one embodiment, two thresholds are used to avoid having to switch (oscillate) between two transmit signal strengths too frequently. For example, the method includes determining whether the measured strength of the signal is lower than a first threshold. As before the strength of the signal may be measured by a signal strength sensor in the stylus and/or the electronic device.

If the strength of the signal measured is lower than the first threshold, it is assumed that the stylus is farther away from the stylus sensor and, accordingly, the transmit signal strength may be increased from the first strength value to the second strength value. It is (e.g., subsequently) determined whether the measured strength of the signal is greater than a second threshold that is larger than the first threshold. If the measured strength of the signal is greater than the second threshold, it is assumed that the stylus is closer to the stylus sensor and, accordingly, the transmit signal strength may be decreased from the second strength value to the first strength value. If the measured strength of the signal is between the first (lower) threshold and the second (larger) threshold, the strength of the signal currently being transmitted by the stylus is within an acceptable level and the strength of the signal transmitted by the stylus is not adjusted.

When the strength of the signal is measured by the stylus, the adjustment (increase and reduction) of the strength of the signal transmitted by the stylus is initiated by the stylus. When the strength of the signal is measured by the electronic device, the adjustment of the strength of the signal transmitted by stylus is initiated by the electronic device. In particular, the electronic device either sends a command to the stylus directing the stylus to increase or decrease the strength of the signal, or sends data indicative of the measured strength of the signal to the stylus and the stylus increases or decreases the strength of the signal accordingly. As used herein, the command and the data sent from the electronic device may be collectively referred to as a "height signal," which is indicative of the height of the stylus as determined by the electronic device.

By reducing the strength of the signal transmitted by the stylus to an acceptable level, incorrect data from the stylus sensor caused by being overloaded or saturated by the signal transmitted by the stylus may be prevented and power may be conserved. Additionally or alternatively, by increasing or boosting the strength of the signal transmitted by the stylus to the acceptable level, the detectable height of the stylus may be increased, i.e., the stylus may be detected by the electronic device from greater distances.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
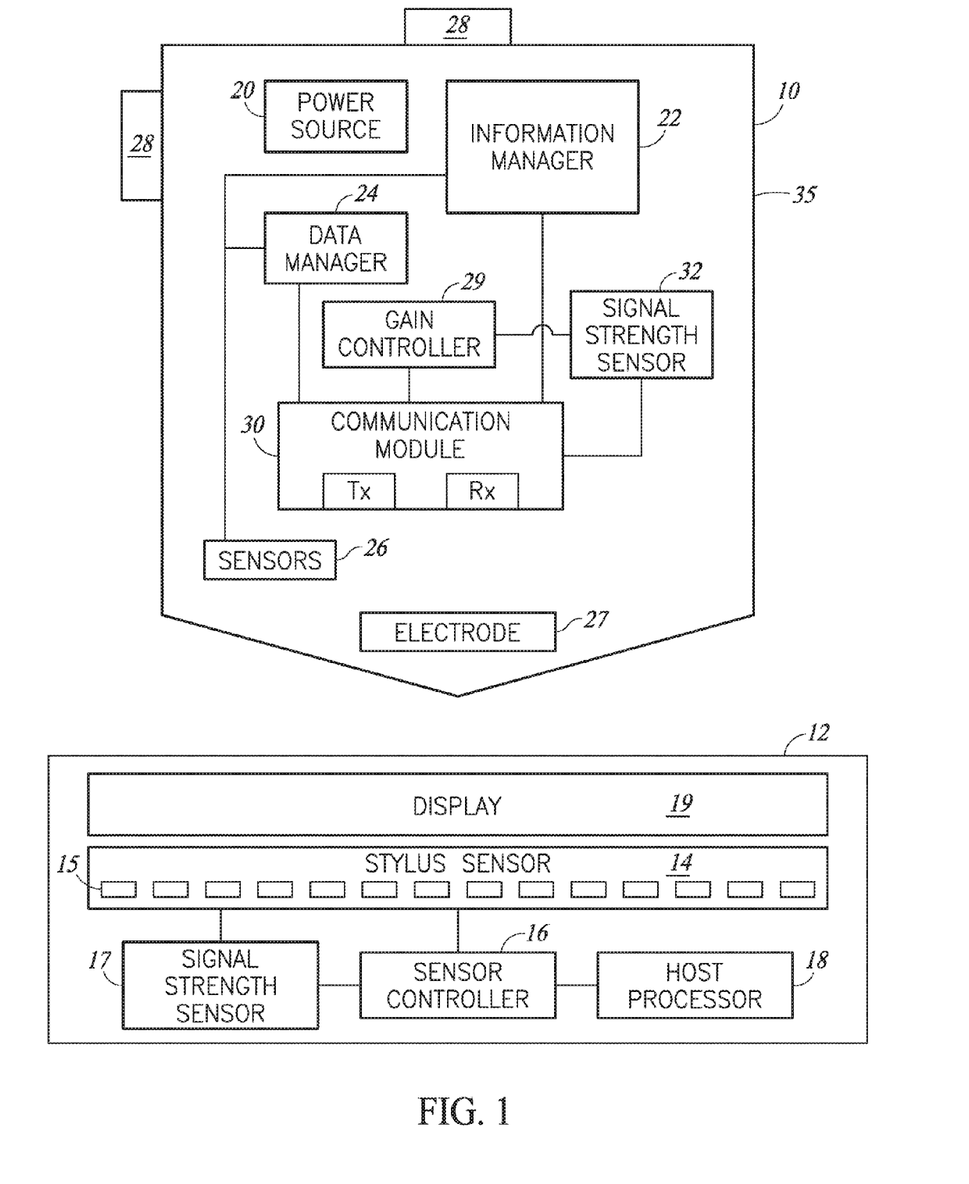
FIG. 1 is a diagram illustrating an example of a system including a stylus and an electronic device according to embodiments disclosed herein.

FIG. 1 is a diagram illustrating an example of a system including a stylus 10 and an electronic device 12 according to one embodiment.

The electronic device 12 may be any type of device that senses a stylus, such as a tablet, a personal computer, a tablet computer, and a smartphone. The electronic device 12 includes a stylus sensor 14, a sensor controller 16, a signal strength sensor 17, a host processor 18, and a display 19. In another embodiment, the host processor 18 and/or the display 19 are external to the electronic device.

The stylus sensor 14 includes a plurality of sensing antennas 15, such as loop coil antennas or line conductor antennas. The sensing antennas (sensor lines) 15 receive or detect signals from the stylus 10. For example, the antennas 15 may be loop coil antennas configured to receive a magnetic field from the stylus 10, or line conductor antennas configured to receive an electrostatic field from the stylus 10. The stylus sensor 14 may have any number of sensing antennas. In one embodiment, the sensing antennas 15 are arranged in a matrix of sensor lines extending in first and second directions different from each other. For example, the sensing antennas 15 may be arranged in array having a plurality of rows and columns. In one embodiment, the stylus sensor 14 is capable of detecting a passive stylus and a finger touch, in addition to the stylus 10.

The sensor controller 16 controls the operation of the stylus sensor 14, performs bidirectional communication with the stylus 10, and communicates with the host processor 18. In one embodiment, the sensor controller 16 processes handwritten input data from the stylus 10 to determine coordinates of a position indicated or pointed to by the stylus 10 on the stylus sensor 14, and forwards the coordinates to the host processor 18.

The signal strength sensor 17 measures strengths of signals received by the sensing antennas 15 from the stylus 10. The signal strength sensor 17 may be any type of sensor that obtains a measurement that is indicative of signal strength, such as voltage, current, tesla, and volts per meter. As will be discussed in further detail below, the strengths of the signals measured by the signal strength sensor 17 are used to determine a location or coordinates of a tip of the stylus 10 on the stylus sensor 14. The strengths of the signals, including data signal, measured by the signal strength sensor 17 are also used to adjust signal strengths of signals transmitted by the stylus 10. In one embodiment, the signal strength sensor 17 is included in the sensor controller 16.

The host processor 18 communicates with the sensor controller 16 and executes a variety of applications or functions. In one embodiment, the host processor 18 receives coordinates from the sensor controller 16 and executes an application or function based on the received coordinates. The sensor controller 16 and the host processor 18 are connected via any suitable interface, such as the USB Human Interface Devices Protocol. In one embodiment, the host processor 18 is a controller or CPU with memory.

The display 19 is configured to display text or graphics. In one embodiment, the display 19 displays text or graphics in response to the stylus 10 being detected by the stylus sensor 14. The display may be located above the stylus sensor 14 as shown in FIG. 1, the display 19 may be located below the stylus sensor 14, or external to the electronic device 12.

The stylus 10 may be any stylus that contains active electronic components. The stylus 10 includes a power source 20, an information manager 22, a data manager 24, sensors 26, buttons 28, a communication module 30, an electrode 27, a signal strength sensor 32, and a gain controller 29. The power source 20, the information manager 22, the data manager 24, sensors 26, the buttons 28, the communication module 30, an electrode 27, the signal strength sensor 32, and the gain controller 29 are housed by a body 35. In one embodiment, the body 35 has an elongated shape.

The power source 20 may be any type of a power source, such as a battery or a parasitic energy conduit, that provides power to the stylus 10.

The information manager 22 includes a memory or cache that stores stylus capability information of the stylus 10. The stylus capability information may include information indicating an operational state of the stylus 10. The stylus capability information may include information regarding predefined capabilities of the stylus and setting information regarding user-adjustable setting of the stylus. The information manager 22 updates the setting information each time a user changes the stylus setting, such as the stylus color and stylus line width.

The data manager 24 prepares operational data indicative of an operational state of the stylus 10, such as tip pressure data, buttons states, and orientation data (e.g., data indicating how much the stylus 10 is twisted or tilted relative to a surface of the stylus sensor 14).

The sensors 26 include one or more sensors, such as a stylus tip pressure sensor (e.g., a variable capacitor) configured to sense pressure applied to the stylus tip; a barrel pressure sensor configured to sense pressure applied to the stylus barrel; a 9-axis or lesser-axis IMU (inertial measurement unit) including one or more combinations of 3-axis gyroscopes, 3-axis accelerometers, and 3-axis magnetometers; a twist sensor configured to sense twist/rotation of the stylus 10; and a tilt sensor configured to sense X and Y directional tilt of an axis of the stylus 10 relative to a surface of the stylus sensor 14. The sensors 26 generate operational data of the stylus 10, such as stylus tip pressure data, stylus barrel pressure data, stylus orientation (e.g., twist or tilt) data, stylus switch status, and stylus battery level.

The buttons 28 allow the user to configure or adjust the stylus 10. For example, a user may use the buttons 28 to update setting information, such as the stylus color and stylus line width. The buttons 28 also allow the user to send instructions or commands to the sensor controller 16. For instance, a user may use the buttons 28 to indicate a right click command to the electronic device 12 similar to a computer mouse. The stylus 10 may include any number of buttons and may be positioned anywhere on the body 35. The buttons 28 may also be replaced with other types of mechanical inputs, such as switches, knobs, etc.

The information manager 22 and the data manager 24 are both coupled to the communication module 30. The communication module 30 is capable of bidirectional communication with the electronic device 12. In one embodiment, the communication module 30 includes transmission (TX) and reception (RX) circuitry that communicates with the electronic device 12 through the electrode 27. The electrode 27 is typically used to electromagnetically or electrostatically communicate with the sensor lines 15 of the stylus sensor 14. In the same or another embodiment, the communication module 30 includes a transmitter and a receiver, or a transceiver, specific to a particular communication protocol. The communication module may utilize any one or more types of communication protocols, such as a protocol based on electromagnetic communication, a protocol based on electrostatic communication, any RF communication protocol such as Bluetooth®. The TX and RX circuitry are sometimes referred to as a signal generator and a signal receiver, respectively.

The communication module 30 transmits or generates stylus capability information and operational data to the sensor controller 16. As previously discussed, stylus capability information may include information regarding predefined capabilities of the stylus and setting information regarding user-adjustable settings of the stylus; and operational data may include data such as stylus tip pressure data, stylus barrel pressure data, stylus orientation (e.g., twist or tilt) data, stylus switch status, and stylus battery level. The communication module 30 may transmit the stylus capability information and operational data via the TX circuitry and the electrode 27, or a transceiver/transmitter specific to a communication protocol (e.g., Bluetooth®).

The communication module 30 receives various commands and other information from the sensor controller 16. The commands may include various commands, such as a read command to request the stylus 10 to transmit stylus capability information to the sensor controller 16, a write command to configure capability information for the stylus 10, and a polling command to request the stylus 10 to transmit operational data of the active stylus to the sensor controller 16. The communication module 30 may receive the various commands and other information via the RX circuitry and the electrode 27, or transceiver/receiver specific to a communication protocol (e.g., Bluetooth®).

Signals transmitted or received by the communication module 40 are transmitted or received through the electrode 27 (and via a separate transmitter/receiver specific to a particular communication protocol, if provided as described above). In one embodiment, as shown in FIG. 1, the electrode 27 is positioned at or near a tip of the body 35.

The signal strength sensor 32 measures strengths of signals received by the RX circuitry, such as signals transmitted from the sensor controller 16. The signal strength sensor 32 may be any type of sensor that obtains a measurement that is indicative of signal strength, such as voltage, current, tesla, and volts per meter. As will be discussed in further detail below, the strengths of the signals measured by the signal strength sensor 32 are used to adjust signal strengths of signals transmitted by the stylus 10. In one embodiment, signal strength sensor 32 is included in the gain controller 29.

The gain controller 29 adjusts the gain or strength of signals transmitted by the stylus 10, more specifically the communication module 30. As will be discussed in further detail below, the gain controller 29 dynamically adjusts a strength of a signal transmitted by the stylus 10 based on a strength of a signal transmitted between the stylus 10 and the electronic device 12.

In one embodiment, signals (e.g., beacon signals, tones, or data signals including stylus capability information and operational data) transmitted by the communication module 30 of the stylus 10 are used to determine a location or coordinates of a tip of the stylus 10 on stylus sensor 14 of the electronic device 12. In particular, the signal strength sensor 17 measures strengths of signals detected or received by the sensing antennas 15 from the communication module 30. The sensor controller 16 then uses the variation of signal strengths over the antennas to interpolate a precise location of a tip of the stylus 10. In one embodiment, the location of the stylus 10 is determined to be near an antenna in which the signal strength is the strongest, as signal strength is typically the strongest in an antenna proximate to the stylus 10 and decreases in antennas further away from the stylus 10. In the same or another embodiment, the sensor controller 16 uses interpolation algorithms that use the strength of two or more antennas nearest to the stylus to improve the resolution of the measured location beyond the antenna spacing.

Figure 2A:
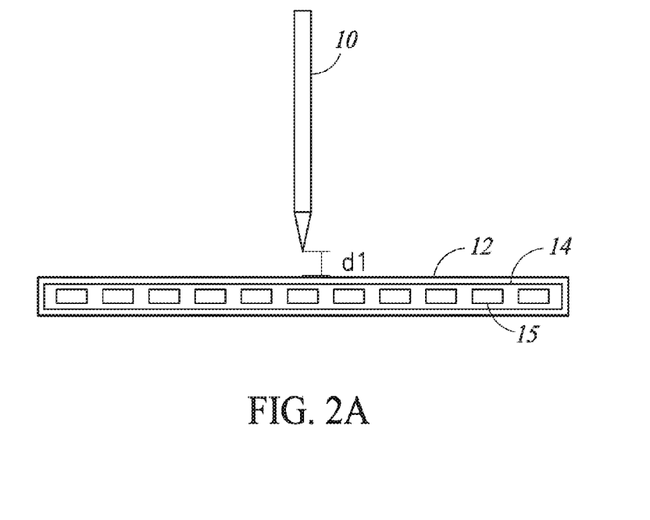
FIG. 2A is a diagram illustrating an example of a stylus being a first distance from a stylus sensor of an electronic device according to embodiments disclosed herein.
Figure 2B:
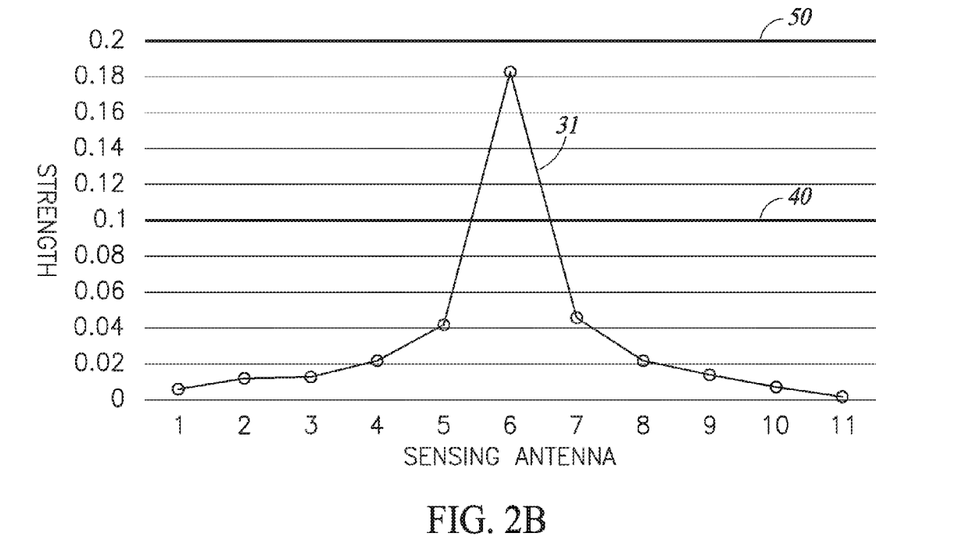
FIG. 2B is a diagram illustrating an example of a signal profile of a signal received by sensing antennas (sensor lines) of a stylus sensor from a stylus when the stylus is a first distance from the stylus sensor according to embodiments disclosed herein.
Figure 3A:
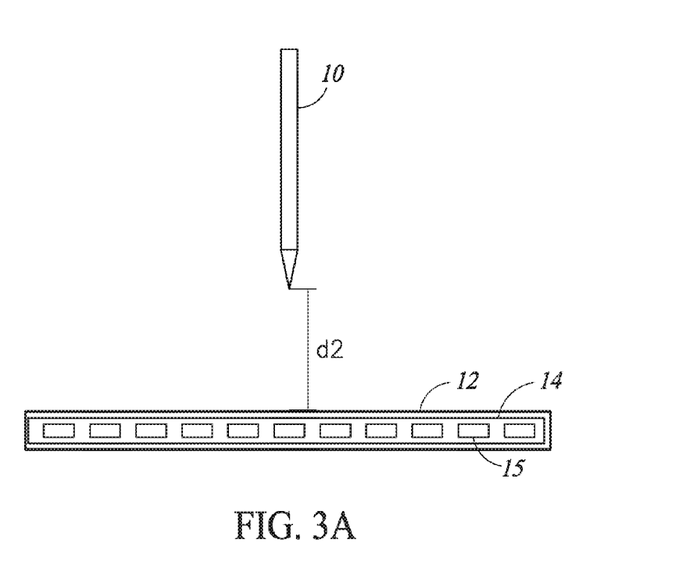
FIG. 3A is a diagram illustrating an example of a stylus being a second distance from a stylus sensor of an electronic device according to embodiments disclosed herein.
Figure 3B:
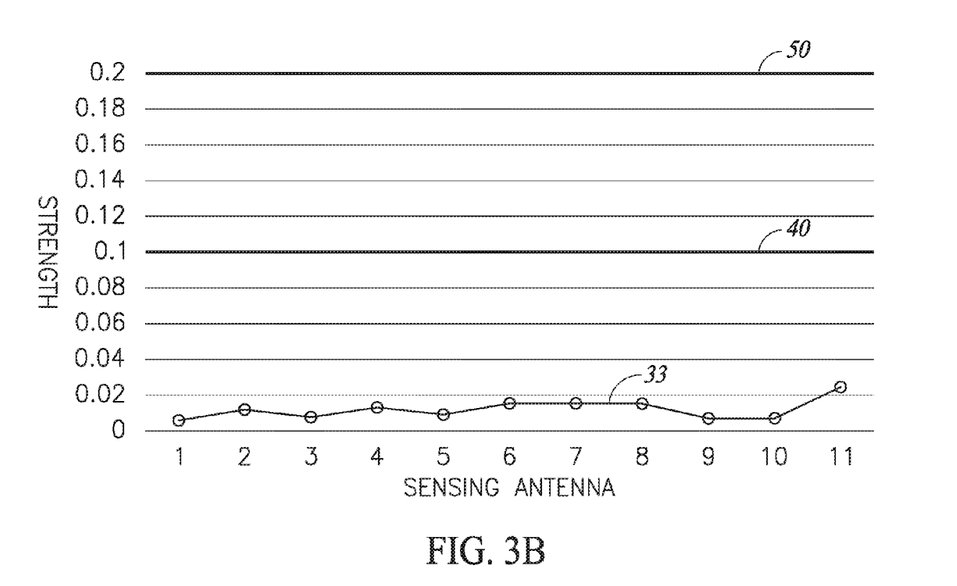
FIG. 3B is a diagram illustrating an example of a signal profile of a signal received by sensing antennas (sensor lines) of a stylus sensor from a stylus when the stylus is a second distance from the stylus sensor according to embodiments disclosed herein.

In general, the strength of signals received by the stylus 10 from the electronic device 12 or signals received by the electronic device 12 from the stylus 10 is stronger when the stylus 10 and the electronic device 12 are in close proximity to each other, and is weaker the further away the stylus 10 and the electronic device 12 are from each other. For example, FIG. 2A is a diagram illustrating an example of the stylus 10, more specifically the electrode 27 at the tip of the stylus, being a first height or distance d1 from the stylus sensor 14 of the electronic device 12 according to one embodiment. FIG. 2B is a diagram illustrating an example of a signal profile of a signal 31 received by sensing antennas of the stylus sensor 14 from the stylus 10 when the stylus 10 is a first distance d1 from the stylus sensor 14 according to one embodiment. Eleven sensing antennas are shown along the x-axis of FIG. 2B, and the strength of the signal 31 received by the sensing antennas are shown along the y-axis of FIG. 2B. The strengths of the received signals may be in terms of any type of unit indicative of signal strength, such as voltage, current, tesla, and volts per meter. FIG. 3A is a diagram illustrating an example of the stylus 10, more specifically the electrode 27 at the tip of the stylus, being a second height or distance d2 from the stylus sensor 14 of the electronic device 12 according to one embodiment. The second distance d2 is larger than the first distance d1. For example, the first distance d1 may be between 0 and 10 millimeters, and the second distance d2 may be between 15 and 25 millimeters. FIG. 3B is a diagram illustrating an example of a signal profile of a signal 33 received by sensing antennas of the stylus sensor 14 from the stylus 10 when the stylus is a second distance d2 from the stylus sensor 14 according to one embodiment. Similar to FIG. 2B, eleven sensing antennas are shown along the x-axis of FIG. 3B, and the strength of the signal 33 received by the sensing antennas is shown along the y-axis of FIG. 3B.

By comparing FIGS. 2B and 3B, it can be seen that a strength of a signal received by the sensing antennas increases when the stylus 10 is closer to the stylus sensor 14. For example, the strength of the signal 31 sensed by sensing antenna number 6 has a value of 0.18 when the stylus 10 is a first distance d1 from the stylus sensor 14, and the strength of the signal 33 sensed by sensing antenna number 6 has a value of under 0.02 when the stylus 10 is a second distance d2, which is larger than the first distance d1, from the stylus sensor 14.

Accordingly, the strength of a signal transmitted between a stylus and a stylus sensor may be used as a proxy or indication for a distance between the stylus 10 and the stylus sensor 14.

In one embodiment, strength of a signal transmitted from the stylus 10 is dynamically adjusted based on a distance or height between the stylus 10 and the electronic device 12. Strength of a signal transmitted between the stylus 10 and the electronic device 12 is used as an indication of the distance or height. As will be discussed in further detail below, adjusting the strength of a signal transmitted from the stylus 10 increases the distance in which the stylus 10 may be detected, prevents oversaturation of the stylus sensor 14, and conserves power of the stylus 10.

Figure 4:
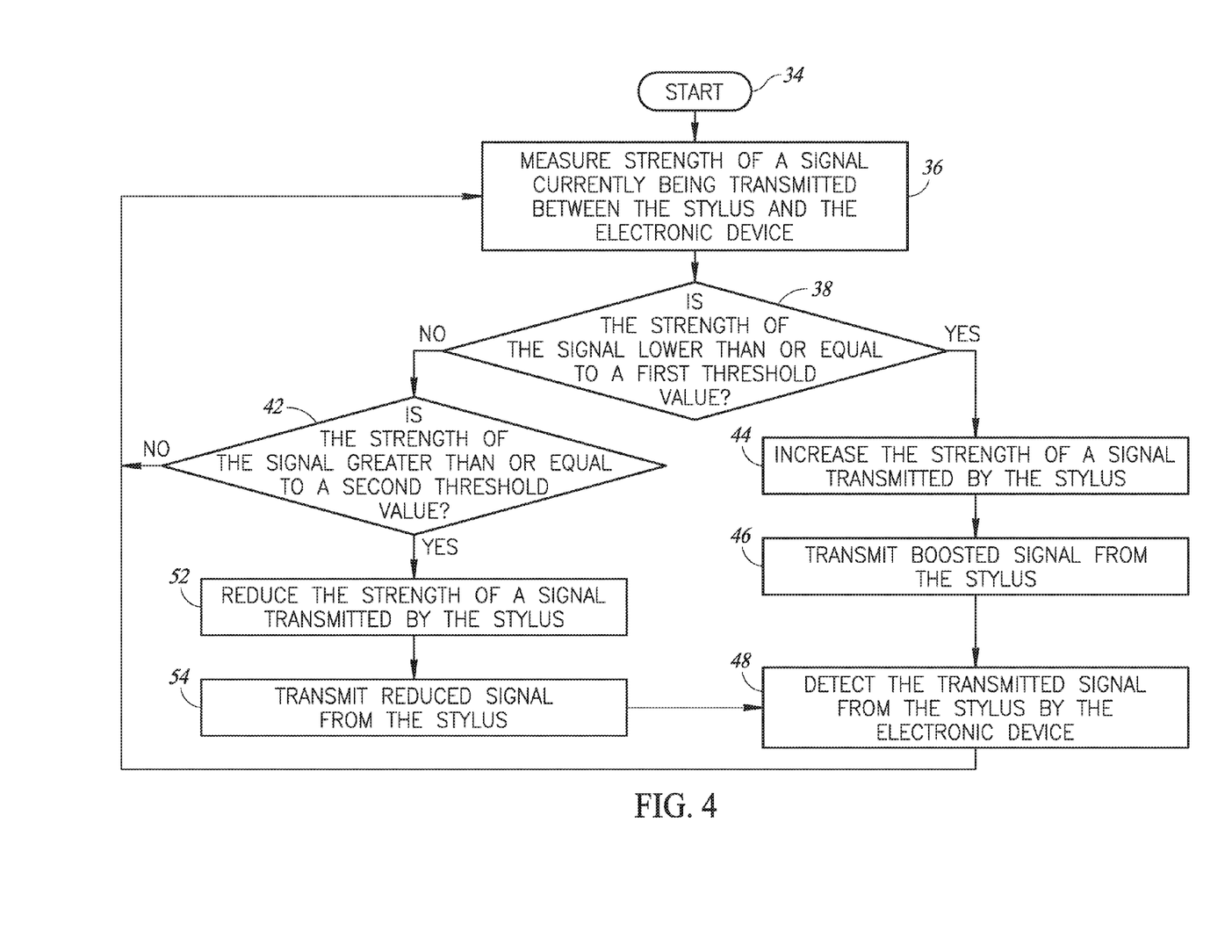
FIG. 4 is a flow diagram illustrating an example of a process for adjusting signal strength of signals transmitted by a stylus according to embodiments disclosed herein.

FIG. 4 is a flow diagram illustrating an example of a process for adjusting signal strength of signals transmitted by the stylus 10 according to one embodiment.

In step 34, the process begins. In step 36, a strength of a signal currently being transmitted between the stylus 10 and the electronic device 12 (i.e., a signal transmitted from the stylus 10 to the electronic device 12, or a signal transmitted from the electronic device 12 to the stylus 10) is measured. As previously discussed, signal strength indicates how far the stylus 10 is from the electronic device 12. Accordingly, the measured signal strength of the signal currently being transmitted is indicative of the current position of the stylus 10 relative to the stylus sensor 14. The signal may be any signal that is transmitted between the stylus 10 and the electronic device 12. For example, as previously discussed, the signal may be a data signal sending stylus capability information, operational data, or a command. As previously discussed, the strength of the signal may be any type of measurement that is indicative of signal strength, such as voltage, current, tesla, and volts per meter.

In one embodiment, the strength of the signal is measured by the stylus 10. For example, a signal, such as a command, is received by the communication module 30 of the stylus 10 from the electronic device 12, and the strength of the received signal is measured by the signal strength sensor 32.

In another embodiment, the strength of the signal is measured by the electronic device 12. For example, a signal, such as a beacon signal or a data signal, is received by the sensing antennas 15 of the stylus sensor 14 from the stylus 10, and the strength of the received signal is measured by the signal strength sensor 17. As will be discussed in further detail below, in this embodiment, the electronic device 12 may either send commands based on the measured signal strength or data indicative of the signal strength to the stylus 10.

In a further embodiment, the strength of the signal is measured based on a combination of the strength as measured by the stylus 10 and the strength as measured by the electronic device 12.

In step 38, it is determined whether the strength of the signal measured in step 36 is lower than or equal to a first threshold 40 (i.e., whether the stylus 10 and the electronic device 12 are distal to each other). In FIGS. 2B and 3B, for example, the first threshold 40 has a value of 0.1. In one embodiment, the first threshold 40 is set according to a particular distance or height between the stylus 10 and the electronic device 12. In other words, the first threshold 40 is set to a value that corresponds to a particular distance, such as 20 millimeters, between the stylus 10 and the electronic device 12. In another embodiment, the first threshold 40 is set based on the sensing capability of the stylus sensor 14. For example, the first threshold 40 may be set such that signal strengths below the second threshold 50 are not properly detected by the stylus sensor 14 and signal strengths above the second threshold 50 are properly detected by the stylus sensor 14.

In one embodiment, as previously discussed, the strength of the signal is measured by the stylus 10. In this embodiment, the determination of step 36 is performed by the stylus 10.

In another embodiment, as previously discussed, the strength of the signal is measured by the electronic device 12. In this embodiment, the determination of step 36 is performed by the electronic device 12.

If the strength of the signal measured in step 36 is not lower than the first threshold 40, it is assumed that the stylus 10 is in close proximity to the electronic device 12. For example, referring to FIG. 2B, the strength of the signal 31 is larger than the first threshold 40 when the stylus 10 is a first distance d1 from the stylus sensor 14. The process then moves to step 42.

If the strength of the signal measured in step 36 is lower than the first threshold 40, it is assumed that the stylus 10 is distal to the electronic device 12. For example, referring to FIG. 3B, the strength of the signal 33 is less than the first threshold 40 when the stylus 10 is a second distance d2 from the stylus sensor 14. The process then moves to step 44.

In step 44, the strength of a signal transmitted by the stylus 10 is increased or boosted. The strength of the signal is increased by the gain controller 29. By increasing or boosting the strength of the signal, the stylus 10 may be detected by the electronic device 12 from greater distances. In one embodiment, the strength of the signal is increased such that the electronic device 12 can detect the stylus 10 from at least 20 millimeters away. In the same or another embodiment, the increase in signal strength of the transmitted signal is chosen such that the increased signal strength will not saturate the receiving circuitry (e.g., the sensing elements 15) of the electronic device 12.

In one embodiment, as previously discussed, the strength of the signal is measured by the stylus 10. In this embodiment, the boosted signal is either a signal currently being transmitted by the stylus 10 or a subsequent signal transmitted by the stylus 10. In addition, the increasing of the strength of the signal transmitted by stylus 10 is initiated and performed by the stylus 10 itself.

In another embodiment, as previously discussed, the strength of the signal is measured by the electronic device 12. In this embodiment, the boosted signal is either the signal measured in step 36 or a subsequent signal transmitted by the stylus 10. In addition, the increasing of the strength of the signal transmitted by stylus 10 is initiated and performed by the electronic device 12. In particular, in one embodiment, the electronic device 12 sends a command to the stylus 10 directing the stylus 10 to increase the strength of the signal. In another embodiment, the electronic device 12 sends data indicative of the strength of the signal measured in step 36 to the stylus 10, and the stylus 10 increases the strength of the signal accordingly. The command and the data are sent via the sensor controller 16. In some embodiments, the command and the data are collectively referred to as a height signal indicative of the height of the stylus 10 relative to the electronic device 12. The command is indicative of the height of the stylus 10 in that the command to increase or decrease the strength of the signal is indicative of the determined height of the stylus 10 being too high or too low, respectively. The data is indicative of the height of the stylus 10 in that the data indicative of a lower or higher measured strength of the signal is, in turn, indicative of the stylus 10 being too high or too low, respectively.

In one embodiment, the strength of the signal is increased in discrete steps. In another embodiment, the strength of the signal is increased continuously. When the strength of the signal is increased continuously, the relationship between received and transmitted signal strengths could be piecewise linear, linear, geometric, or some other transfer function between receiver and transmitter depending on implementation.

In one embodiment, a form of Automatic Gain Control (AGC) is used to modulate transmitted signal strength based on the received signal. For example, the gain signal from the AGC may be used as the transmit signal strength control. This is particularly useful for styli that retransmit a touch scan signal. In this embodiment, the stylus 10 is in control of the signal strength.

In step 46, the stylus 10 transmits the boosted signal. The boosted signal is transmitted by the communication module 30 via the TX circuitry and the electrode 27. The process then moves to step 48.

In step 48, the electronic device 12 detects the transmitted signal from the stylus 10. The signal is sensed by the sensing elements 15 of the stylus sensor 14. Upon the signal being detected by the electronic device 12, the electronic device 12, more specifically the sensor controller 16 or the host processor 18, may perform a variety of actions in response. In one embodiment, the electronic device 12 ignores other types of detections, such as a finger touch, by the stylus sensor 14 besides the boosted signal so that unintentional touches, such as a hand holding the stylus 10 or the electronic device 12, are not falsely detected. The process then returns to step 36, in which strength of a signal that is currently being transmitted between the stylus 10 and the electronic device is measured.

Returning to step 38, if the strength of the signal is not lower than the first threshold 40, the process moves to step 42. In step 42, it is determined whether the strength of the signal measured in step 36 is greater than or equal to a second threshold 50 (i.e., whether the stylus 10 and the electronic device 12 are in close proximity to each other) and are within an acceptable level. In FIGS. 2B and 3B, for example, the second threshold 50 has a value of 0.2. In one embodiment, the second threshold 50 is set according to a distance between the stylus 10 and the electronic device 12. In other words, the second threshold 50 is set to a value that corresponds to a particular distance, such as 5 millimeters, between the stylus 10 and the electronic device 12. In another embodiment, the second threshold 50 is set to avoid incorrect position measurement by the stylus sensor 14 caused by being overloaded or saturated by the signal transmitted by the stylus 10. For example, the second threshold 50 may be set such that signal strengths below the second threshold 50 will not overload or saturate the stylus sensor 14, and signal strengths above the second threshold 50 may overload or saturate the stylus sensor 14. In another embodiment, the second threshold 50 is set to conserve power of the stylus 10 and avoid excessive battery drain. For instance, the second threshold 50 may be set such that signal strengths below the second threshold 50 will not drain excessive power from the power source 20 and signal strengths above the second threshold 50 may drain excessive power from the power source 20.

In one embodiment, as previously discussed, the strength of the signal is measured by the stylus 10. In this embodiment, the determination of step 36 is performed by the stylus 10.

In another embodiment, as previously discussed, the strength of the signal is measured by the electronic device 12. In this embodiment, the determination of step 36 is performed by the electronic device 12.

If the strength of the signal measured in step 36 is not greater than the second threshold 50, it is assumed that the stylus 10 and the electronic device 12 are not in close proximity to each other and the strength of the signal currently being transmitted by the stylus 10 is within an acceptable level. Accordingly, no action is taken and a current strength of a signal transmitted by the stylus 10 is maintained. The process then returns to step 36, in which strength of another or subsequent signal transmitted between the stylus 10 and the electronic device 12 is measured.

If the strength of the signal measured in step 36 is greater than the second threshold 50, it is assumed that the stylus 10 and the electronic device 12 are in close proximity to each other and the strength of the signal currently being transmitted by the stylus 10 is not within an acceptable level. The process then moves to step 52.

In step 52, the strength of the signal transmitted by the stylus 10 is reduced and set to an appropriate strength level. The strength of the signal is reduced by the gain controller 29. By reducing the strength of the signal transmitted by the stylus 10, incorrect position measurement by the stylus sensor 14 caused by being overloaded or saturated by the signal transmitted by the stylus 10 may be prevented, and power may be conserved.

In one embodiment, as previously discussed, the strength of the signal is measured by the stylus 10. In this embodiment, the reduced signal is either a signal currently being transmitted by the stylus 10 or a subsequent signal transmitted by the stylus 10. In addition, the reduction of the strength of the signal transmitted by stylus 10 is initiated and performed by the stylus 10, itself.

In another embodiment, as previously discussed, the strength of the signal is measured by the electronic device 12. In this embodiment, the reduced signal is either the signal measured in step 36 or a subsequent signal transmitted by the stylus 10. In addition, the decreasing of the strength of the signal transmitted by stylus 10 is initiated and performed by the electronic device 12. In particular, in one embodiment, the electronic device 12 sends a command to the stylus 10 directing the stylus 10 to decrease the strength of the signal. In another embodiment, the electronic device 12 sends data indicative of the strength of the signal measured in step 36 to the stylus 10, and the stylus 10 decreases the strength of the signal accordingly. The command and the data are sent via the sensor controller 16.

In one embodiment, the strength of the signal is decreased in discrete steps. In another embodiment, the strength of the signal is decreased continuously. When the strength of the signal is increased continuously, the relationship between received and transmitted signal strengths could be piecewise linear, linear, geometric, or some other transfer function between receiver and transmitter depending on implementation.

In one embodiment, the second threshold 50 is larger than the first threshold 40. By utilizing two different values for the first threshold 40 and the second threshold 50, unnecessary increasing and decreasing of the strength of the signal transmitted by the stylus 10 may be avoided. For example, if a single threshold is used for both steps 38 and 42, a signal that fluctuates above and below the single threshold will have its strength oscillating between being decreased in step 42 and increased in step 44. By using two separate thresholds for steps 38 and 42, such alternating between increasing and decreasing of the signal can be mitigated or avoided.

In step 54, the stylus 10 transmits the reduced signal. The boosted signal is transmitted by the communication module 30 via the TX circuitry and the electrode 27. The process then moves to step 48. As discussed above, in step 48, the electronic device 12 detects the transmitted signal from the stylus 10.

In accordance with one or more embodiments, the system and process for adjusting signal strength of signals transmitted by the stylus 10 improves detection of the stylus 10 at greater distances, prevents over saturation of the stylus sensor 14, and conserves power of the stylus 10. Increasing the distance in which a stylus may be detected by an electronic device is particularly beneficial for a stylus sensor that is capable of sensing a stylus and a finger touch. By detecting a stylus well above a surface of a stylus sensor, the electronic device may quickly distinguish between a user using a stylus and a user using his or her finger, and respond accordingly. For example, once it is determined that a user is using a stylus, finger or hand touches by a user may be ignored. Accordingly, unintentional touches, such as a user's a hand holding the stylus or the electronic device, may be disregarded.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active stylus, comprising:
   a body including an electrode;
   a signal generator coupled to the electrode to transmit a signal from the electrode; and
   a gain controller configured to:
   determine a height of the electrode relative to a surface of a sensor including a matrix of sensor lines extending in first and second directions different from each other;
   set a transmit signal strength of the signal transmitted from the electrode to a first strength value when the height is determined to be a first height value, and to a second strength value when the height is determined to be a second height value, wherein the first strength value is lower than the second strength value and the first height value is lower than the second height value;
   increase the transmit signal strength from the first strength value to the second strength value when the height exceeds a first threshold;
   decrease the transmit signal strength from the second strength value to the first strength value when the height falls below a second threshold, wherein the first threshold is lower than the second threshold; and
   maintain the transmit signal strength when the height is between the first threshold and the second threshold.

2. The active stylus of claim 1, wherein the gain controller is configured to discretely vary the transmit signal strength in a step between the first strength value and the second strength value.

3. The active stylus of claim 1, wherein the gain controller is configured to continuously vary the transmit signal strength between the first strength value and the second strength value corresponding to continuously varying heights of the active stylus.

4. The active stylus of claim 1, wherein the height of the electrode is determined from one or both of a strength of a sensor signal received by the active stylus and a strength of a stylus signal received by the sensor.

5. The active stylus of claim 1, wherein the gain controller is configured to determine the height of the electrode based on a sensor signal received by the active stylus.

6. The active stylus of claim 1, wherein the gain controller is configured to determine the height of the electrode based on a height signal received by the active stylus, wherein the height signal indicates a height of the active stylus determined by a sensor controller coupled to the sensor based on a stylus signal received by the sensor.

7. The active stylus of claim 6, wherein the electrode of the active stylus receives the height signal from the sensor.

8. The active stylus of claim 7, wherein the electrode of the active stylus electrostatically receives the height signal from the sensor.

9. The active stylus of claim 7, further comprising a receiver configured to receive the height signal from the sensor.

10. The active stylus of claim 9, wherein the receiver is a Bluetooth® communicator.

11. The active stylus of claim 1, wherein the body has an elongate shape and the electrode is provided at or near a tip of the elongate body.

12. A method for detecting a position of an active stylus, which includes an electrode, on a sensor which includes a matrix of sensor lines extending in first and second directions different from each other, the method comprising:
determining a height of the electrode relative to a surface of the sensor;
setting a transmit signal strength of a signal transmitted from the electrode of the active stylus to a first strength value when the height is determined to be a first height value, and to a second strength value when the height is determined to be a second height value, wherein the first strength value is lower than the second strength value and the first height value is lower than the second height value;
increasing the transmit signal strength from the first strength value to the second strength value when the height exceeds a first threshold;
decreasing the transmit signal strength from the second strength value to the first strength value when the height falls below a second threshold, wherein the first threshold is lower than the second threshold; and
maintaining the transmit signal strength when the height is between the first threshold and the second threshold.

13. The method of claim 12, comprising discretely varying the transmit signal strength in a step between the first strength value and the second strength value.

14. The method of claim 12, comprising continuously varying the transmit signal strength between the first strength value and the second strength value corresponding to continuously varying heights of the active stylus.

15. The method of claim 12, wherein the height of the electrode is determined from one or both of a strength of a sensor signal received by the active stylus and a strength of a stylus signal received by the sensor.

16. The method of claim 12, comprising determining the height of the electrode based on a sensor signal received by the active stylus.

17. The method of claim 12, comprising determining the height of the electrode based on a height signal received by the active stylus, wherein the height signal indicates a height of the active stylus determined by a sensor controller coupled to the sensor based on a stylus signal received by the sensor.

* * * * *